United States Patent
Zhang et al.

(10) Patent No.: US 11,782,474 B2
(45) Date of Patent: Oct. 10, 2023

(54) CLOCK CONTROL METHOD, APPARATUS, AND DEVICE, AND STORAGE MEDIUM

(71) Applicant: INSPUR (BEIJING) ELECTRONIC INFORMATION INDUSTRY CO., LTD, Beijing (CN)

(72) Inventors: Jingwei Zhang, Beijing (CN); Tiejun Liu, Beijing (CN); Dan Liu, Beijing (CN)

(73) Assignee: INSPUR (BEIJING) ELECTRONIC INFORMATION INDUSTRY CO., LTD, Beijing (CN)

( * ) Notice: Subject to any disclaimer, the term of this patent is extended or adjusted under 35 U.S.C. 154(b) by 0 days.

(21) Appl. No.: 18/011,566

(22) PCT Filed: Feb. 25, 2021

(86) PCT No.: PCT/CN2021/077803
§ 371 (c)(1),
(2) Date: Dec. 20, 2022

(87) PCT Pub. No.: WO2022/016864
PCT Pub. Date: Jan. 27, 2022

(65) Prior Publication Data
US 2023/0185326 A1 Jun. 15, 2023

(30) Foreign Application Priority Data
Jul. 22, 2020 (CN) .......................... 202010711709.8

(51) Int. Cl.
*G06F 1/04* (2006.01)
*G06F 13/42* (2006.01)

(52) U.S. Cl.
CPC ............ *G06F 1/04* (2013.01); *G06F 13/4221* (2013.01); *G06F 2213/0026* (2013.01)

(58) Field of Classification Search
CPC .......... G06F 1/04; G06F 1/12; G06F 13/4221; G06F 2213/0026
See application file for complete search history.

(56) References Cited

U.S. PATENT DOCUMENTS 6,323,714 B1    11/2001  Naffzinger et al.
2005/0111537 A1  5/2005  Sunter et al.
(Continued)

FOREIGN PATENT DOCUMENTS

CN    1787427 A    6/2006
CN    101504680 A  8/2009
(Continued)

OTHER PUBLICATIONS

Corresponding International Patent Application No. PCT/CN2021/077803, International Search Report, dated Jun. 1, 2021. English Translation.
(Continued)

*Primary Examiner* — Glenn A. Auve
(74) *Attorney, Agent, or Firm* — Cooper Legal Group LLC (57) ABSTRACT

A clock control method, apparatus, and device, and a storage medium. By the method, timing optimization of bidirectional data communication between a server mainboard and a Peripheral Component Interconnect express (PCIe) expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board. In addition, the present application further provides a clock control apparatus and
(Continued)

device, and a storage medium, and the beneficial effects are as stated above.

20 Claims, 4 Drawing Sheets

(56) References Cited

U.S. PATENT DOCUMENTS

| | | | |
|---|---|---|---|
| 2010/0189109 | A1 | 7/2010 | Nakajima et al. |
| 2012/0030495 | A1 | 2/2012 | Chandhoke et al. |
| 2014/0269844 | A1 | 9/2014 | Shimizu et al. |
| 2015/0088437 | A1 | 3/2015 | Lin |

FOREIGN PATENT DOCUMENTS

| | | | |
|---|---|---|---|
| CN | 103218981 | A | 7/2013 |
| CN | 105335321 | A | 2/2016 |
| CN | 105527563 | A | 4/2016 |
| CN | 107220204 | A | 9/2017 |
| CN | 107430568 | A | 12/2017 |
| CN | 108768574 | A | 11/2018 |
| CN | 109215561 | A | 1/2019 |
| CN | 109547146 | A | 3/2019 |
| CN | 109582591 | A | 4/2019 |
| CN | 109818701 | A | 5/2019 |
| CN | 110321316 | A | 10/2019 |
| CN | 110389924 | A | 10/2019 |
| CN | 110460505 | A | 11/2019 |
| CN | 110834655 | A | 2/2020 |
| CN | 110995537 | A | 4/2020 |
| CN | 111045358 | A | 4/2020 |
| CN | 111092789 | A | 5/2020 |
| CN | 111327500 | A | 6/2020 |
| CN | 111385047 | A | 7/2020 |
| CN | 111949589 | A | 11/2020 |

OTHER PUBLICATIONS

Corresponding International Patent Application No. PCT/CN2021/077803, Written Opinion, dated Jun. 1, 2021. English Translation.
Corresponding Chinese Patent Application No. 202010711709.8, First Office Action, dated Oct. 29, 2022.
Corresponding Chinese Patent Application No. 202010711709.8, Notification of Patent Grant, dated Apr. 29, 2022.
Ying, Li, et al., "Synchronous Burst Static RAM (SBSRAM) and Application in DSP System", Science Technology and Engineering, Sep. 2006, pp. 1671-1815, vol. 6, No. 18., with English Abstract.
Kaeriyama, et al., "A 1-to-2GHz 4-Phase On-Chip Clock Generator with Timing-Margin Test Capability", Digest of Technical Papers, ISSCC, Feb. 13, 2007, pp. 174-175, Session 9, Clocking, 9.2.

CLOCK CONTROL METHOD, APPARATUS, AND DEVICE, AND STORAGE MEDIUM

This application claims priority to Chinese Patent Application No. CN202010711709.8, filed on Jul. 22, 2020, in China National Intellectual Property Administration and entitled "Clock Control Method, Apparatus, and Device, and Storage Medium", the contents of which are hereby incorporated by reference in its entirety.

FIELD

The present application relates to the field of data communication, and particularly to a clock control method, apparatus, and device, and a storage medium.

BACKGROUND

A Peripheral Component Interconnect expression (PCIe) expansion board is usually connected with a server mainboard in a server, and performs a specific logical operation on external data input to the server mainboard, so as to provide corresponding operational service for the server mainboard.

Figure 1:
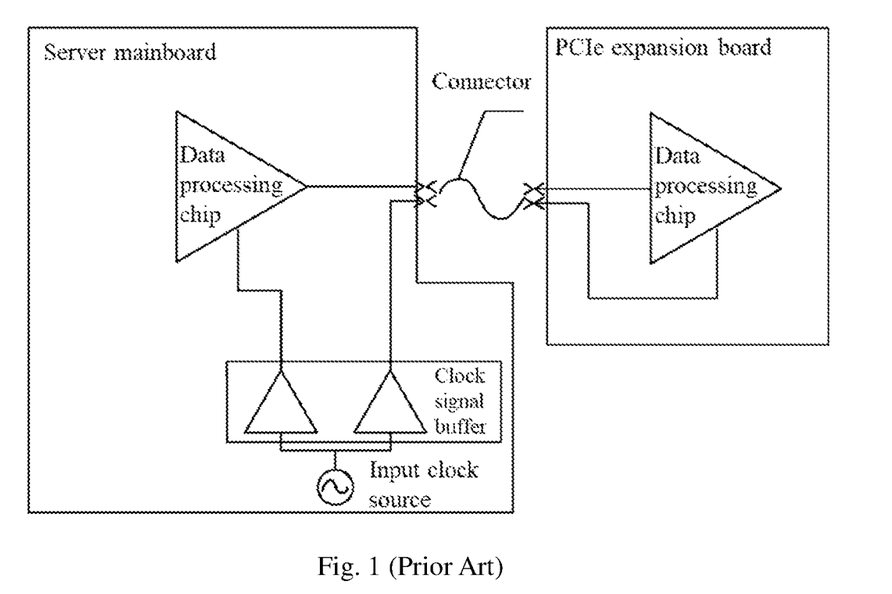
FIG. 1 is a schematic diagram of a connecting structure between a PCIe expansion board and a server mainboard.
Figure 2:
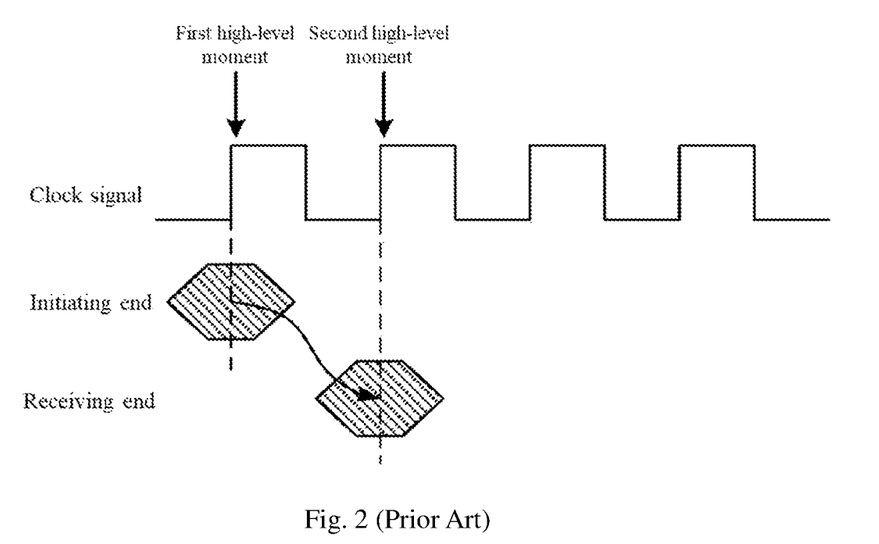
FIG. 2 is a schematic timing diagram of data transmission and reception between a PCIe expansion board and a server mainboard.

From a schematic diagram of a connecting structure between a PCIe expansion board and a server mainboard in FIG. 1, it can be seen that the PCIe expansion board is usually connected with the server mainboard through a connector, and performs data interaction based on a specific communication protocol and a homologous clock of a clock frequency corresponding to the communication protocol. That is, a clock signal of a clock source satisfies the clock frequency specified by the communication protocol between the PCIe expansion board and the server mainboard. Clock signals of the same clock source are transmitted to a data processing chip of the server mainboard and a data processing chip of the PCIe expansion board through a clock buffer respectively, and on this basis, the data processing chip of the server mainboard and the data processing chip of the PCIe expansion board transmit and receive data based on the clock signals. Data transmission and reception between the server mainboard and the PCIe expansion board are performed bidirectionally based on the same link, where FIG. 2 shows a schematic timing diagram. The initiating end in the server mainboard and the PCIe expansion board initiates data to the receiving end at a first high-level moment of the clock signal, and the receiving end correspondingly loads, at a second high-level moment of the clock signal, the data transmitted by the initiating data.

During data transmission between a server mainboard and a PCIe expansion board, there is usually brought a time cost during data transmission by cables and inherent physical attributes of a data processing chip, and further, data transmitted by the initiating end at a first high-level moment may not yet reach the data processing chip when the receiving end loads, through the data processing chip at a second high-level moment, the data transmitted by the initiating end. As a result, it is hard to ensure the reliability of communication between the server mainboard and the PCIe expansion board.

Therefore, providing a clock control method to relatively ensure the reliability of communication between a server mainboard and a PCIe expansion board is a problem that those skilled in the art need to solve.

SUMMARY

An objective of the present application is to provide a clock control method, apparatus, and device, and a storage medium, to relatively ensure the reliability of communication between a server mainboard and a PCIe expansion board.

In order to solve the foregoing technical problem, the present application provides a clock control method, including:

obtaining hardware parameters of a server mainboard and a PCIe expansion board, where the PCIe expansion board is connected to the server mainboard;

calculating, according to the hardware parameters, a first time margin and a second time margin during data transmission between the server mainboard and the PCIe expansion board that mutually serve as an initiating end and a corresponding receiving end respectively;

determining whether a sum of the first time margin and the second time margin is greater than 0;

if the sum of the first time margin and the second time margin is greater than 0, generating a corresponding clock phase difference based on a time margin average of the first time margin and the second time margin;

initiating clock signals to the server mainboard and the PCIe expansion board respectively according to the clock phase difference.

In some embodiments, the calculating, according to the hardware parameters, the first time margin and the second time margin during data transmission between the server mainboard and the PCIe expansion board that mutually serve as an initiating end and a corresponding receiving end respectively includes:

calculating, according to the hardware parameters, a first delay time and a second delay time during data transmission between the server mainboard and the PCIe expansion board that mutually serve as the initiating end and the corresponding receiving end respectively;

calculating the first time margin of the first delay time relative to a clock cycle and the second time margin of the second delay time relative to the clock cycle.

In some embodiments, before the calculating the first time margin of the first delay time relative to the clock cycle and the second time margin of the second delay time relative to the clock cycle, the method further includes:

obtaining communication protocol parameters between the server mainboard and the PCIe expansion board;

obtaining a corresponding clock cycle according to the communication protocol parameters.

In some embodiments, the generating a corresponding clock phase difference based on the time margin average of the first time margin and the second time margin includes:

calculating a corresponding phase angle based on a proportion of the time margin average of the first time margin and the second time margin in a clock cycle;

setting the phase angle as the clock phase difference.

In some embodiments, the hardware parameters include communication line parameters and chip operation parameters.

In some embodiments, if the sum of the first time margin and the second time margin is less than 0, the method further includes:

calculating a corresponding clock cycle increment according to an absolute value of the sum of the first time margin and the second time margin;

increasing the clock cycle by the clock cycle increment to obtain a corresponding new clock frequency;

initiating clock signals to the server mainboard and the PCIe expansion board respectively according to the new clock frequency.

In some embodiments, before the calculating a corresponding clock cycle increment according to the absolute value of the sum of the first time margin and the second time margin, the method further includes:

outputting a parameter modification option of the hardware parameters to a user;

determining whether the user selects the parameter modification option;

if the parameter modification option is selected, generating optimization suggestion information of the hardware parameters according to the sum of the first time margin and the second time margin;

otherwise the step of calculating a corresponding clock cycle increment according to the absolute value of the sum of the first time margin and the second time margin is performed.

In addition, the present application also provides a clock control apparatus, including:

a parameter obtaining module, configured to obtain hardware parameters of a server mainboard and a Peripheral Component Interconnect express (PCIe) expansion board, wherein the PCIe expansion board is connected to the server mainboard;

a margin calculation module, configured to calculate, according to the hardware parameters, a first time margin and a second time margin during data transmission between the server mainboard and the PCIe expansion board that mutually serve as an initiating end and a corresponding receiving end respectively;

a margin determining module, configured to determine whether a sum of the first time margin and the second time margin is greater than 0, and if YES, call a phase calculation module;

a phase calculation module, configured to generate a corresponding clock phase difference based on a time margin average of the first time margin and the second time margin;

a phase control module, configured to initiate clock signals to the server mainboard and the PCIe expansion board respectively according to the clock phase difference.

In addition, the present application also provides a clock control device, including:

a memory, configured to store a computer program;

a processor, configured to execute the computer program to implement any steps of the clock control method as described above.

In addition, the present application also provides a computer-readable storage medium, storing a computer program that is executed by a processor to implement the steps of the clock control method as described above.

According to the clock control method provided in the present application, hardware parameters of a server mainboard and a PCIe expansion board connected to the server mainboard are obtained first; further, a first time margin and a second time margin during data transmission between the server mainboard and the PCIe expansion board that mutually serve as an initiating end and a corresponding receiving end respectively are calculated according to the hardware parameters; furthermore, whether a sum of the first time margin and the second time margin is greater than 0 is determined; if YES, a corresponding clock phase difference is generated based on a time margin average of the first time margin and the second time margin; and clock signals are further initiated to the server mainboard and the PCIe expansion board respectively according to the clock phase difference. In the method, according to the first time margin and second time margin of unidirectional communication between the server mainboard and the PCIe expansion board, when the sum of the first time margin and the second time margin is greater than 0, the corresponding clock phase difference is generated according to the time margin average of the first time margin and the second time margin, and the clock signals are initiated to the server mainboard and the PCIe expansion board respectively according to the clock phase difference. In this manner, timing optimization of bidirectional data communication between the server mainboard and the PCIe expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board. In addition, the present application further provides a clock control apparatus and device, and a storage medium, and the beneficial effects are as stated above.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

During data transmission between a server mainboard and a PCIe expansion board, there is usually brought a time cost during data transmission by cables and inherent physical attributes of a data processing chip, and further, data transmitted by the initiating end at a first high-level moment may not yet reach the data processing chip when the receiving end loads, through the data processing chip at a second high-level moment, the data transmitted by the initiating end. As a result, it is hard to ensure the reliability of communication between the server mainboard and the PCIe expansion board.

To this end, a core of the present application is to provide a clock control method, to relatively ensure the reliability of communication between a server mainboard and a PCIe expansion board.

In order to enable those skilled in the art to better understand the solution of the present application, the present application will be further described in detail below with reference to the accompanying drawings and specific embodiments.

Figure 3:
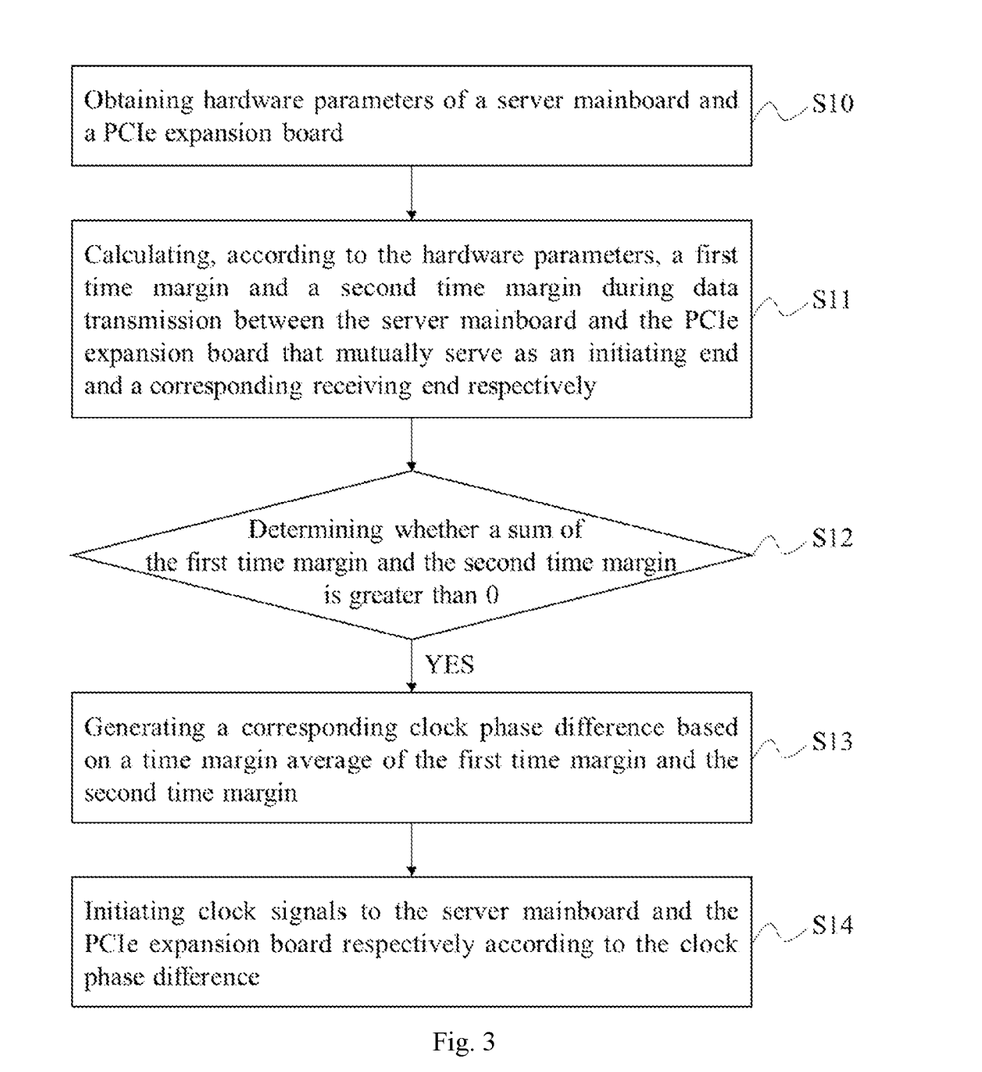
FIG. 3 is a flowchart of a clock control method according to an embodiment of the present application.

Referring to FIG. 3, the embodiments of the present application disclose a clock control method, including the following steps.

Step S10: obtaining hardware parameters of a server mainboard and a PCIe expansion board, where the PCIe expansion board is connected to the server mainboard.

It is to be noted that an execution body of the present embodiment may be a clock signal generation device, or a clock signal control device connected with the clock signal generation device to forward clock signals to the PCIe expansion board and the server mainboard.

In addition, the server mainboard in the present embodiment refers to a circuit board that is arranged in a server and capable of supporting running of related service in the server and has data input and output functions. Processor chips and various functional chips, etc., may further be arranged in the server mainboard. The PCIe expansion board refers to a circuit board satisfying a PCIe bus standard architecture, has a specific data processing function, and is connected to the server mainboard to provide specific functional service for the server mainboard. The PCIe expansion board in the present embodiment includes, but not limited to, a Smart Network Interface Card (Smart-NIC), and is a computing communication unit that assists a Central Processing Unit (CPU) of the server in processing a network-side data load by use of the heterogeneous computing performance of a Field Programmable Gate Array (FPGA).

In this step, the purpose of obtaining the hardware parameters of the server mainboard and the PCIe expansion board is to calculate, in subsequent steps according to the hardware parameters, a time cost during communication between the server mainboard and the PCIe expansion board.

Step S11: calculating, according to the hardware parameters, a first time margin and a second time margin during data transmission between the server mainboard and the PCIe expansion board that mutually serve as an initiating end and a corresponding receiving end respectively.

After obtaining the hardware parameters of the server mainboard and the PCIe expansion board, the first time margin and the second time margin during data transmission between the server mainboard and the PCIe expansion board that mutually serve as the initiating end and a corresponding receiving end respectively are further calculated in this step according to the hardware parameters. That is, in this step, a time margin during data transmission from the server mainboard to the PCIe expansion board and a time margin during data transmission from the PCIe expansion board to the server mainboard are calculated respectively according to the hardware parameters of the server mainboard and the PCIe expansion board. Here, the first time margin and the second time margin are time margins corresponding to two data transmission directions between the server mainboard and the PCIe expansion board respectively. The time margin refers to time from a moment when the receiving end receives data to a next high-level moment after the initiating end transmits the data to the receiving end at a given high-level moment of a clock signal.

Step S12: determining whether a sum of the first time margin and the second time margin is greater than 0; if YES, performing step S13.

It is to be noted that, after the first time margin and the second time margin during data transmission between the server mainboard and the PCIe expansion board that mutually serve as the initiating end and the corresponding receiving end respectively are calculated according to the hardware parameters, the purpose of determining whether a sum of the first time margin and the second time margin is greater than 0 is to determine whether equilibrium optimization may be performed between the first time margin and the second time margin.

Step S13: generating a corresponding clock phase difference based on the time margin average of the first time margin and the second time margin.

After determining the sum of the first time margin and the second time margin is greater than 0, a corresponding clock phase difference is further generated in this step based on a time margin average of the first time margin and the second time margin, namely the corresponding clock phase difference is further calculated according to the average of the first time margin and the second time margin, so as to adjust a phase difference of clock signals between the server mainboard and the PCIe expansion board in subsequent steps to further adjust data transmission and reception moments between the server mainboard and the PCIe expansion board.

Step S14: initiating clock signals to the server mainboard and the PCIe expansion board respectively according to the clock phase difference.

After generating a corresponding clock phase difference based on the time margin average of the first time margin and the second time margin, clock signals are further initiated in this step to the server mainboard and the PCIe expansion board according to the clock phase difference, so as to adjust a time difference of high-level signals of the two clock signals at adjacent moments to ensure the reliability of bidirectional data transmission and reception between the server mainboard and the PCIe expansion board.

According to the clock control method provided in the present application, hardware parameters of a server mainboard and a PCIe expansion board connected to the server mainboard are obtained first; further, a first time margin and a second time margin during data transmission between the server mainboard and the PCIe expansion board that mutually serve as an initiating end and a corresponding receiving end respectively are calculated according to the hardware parameters; furthermore, whether a sum of the first time margin and the second time margin is greater than 0 is determined; if YES, a corresponding clock phase difference is generated based on a time margin average of the first time margin and the second time margin; and clock signals are further initiated to the server mainboard and the PCIe expansion board respectively according to the clock phase difference. In the method, according to the first time margin and second time margin of unidirectional communication between the server mainboard and the PCIe expansion board, when the sum of the first time margin and the second time margin is greater than 0, the corresponding clock phase difference is generated according to the time margin average of the first time margin and the second time margin, and the clock signals are initiated to the server mainboard and the PCIe expansion board respectively according to the clock phase difference. In this manner, timing optimization of bidirectional data communication between the server mainboard and the PCIe expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board.

Based on the above-mentioned embodiment, as a preferred implementation mode, the calculating, according to the hardware parameters, the first time margin and the second time margin during data transmission between the server mainboard and the PCIe expansion board that mutually serve as an initiating end and a corresponding receiving end respectively includes:

calculating, according to the hardware parameters, a first delay time and a second delay time during data transmission between the server mainboard and the PCIe expansion board that mutually serve as the initiating end and the corresponding receiving end respectively;

calculating the first time margin of the first delay time relative to a clock cycle and the second time margin of the second delay time relative to the clock cycle.

It is to be noted that the key point of the present implementation mode is that, when the first time margin and the second time margin during data transmission between the server mainboard and the PCIe expansion board that mutually serve as the initiating end and the corresponding receiving end respectively are calculated according to the hardware parameters, first delay time and second delay time during data transmission between the server mainboard and the PCIe expansion board that mutually serve as the initiating end and the corresponding receiving end respectively are first calculated according to the hardware parameters, and then the first time margin of the first delay time relative to a clock cycle and the second time margin of the second delay time relative to the clock cycle are calculated. Here, the first time margin is essentially a time value obtained by subtracting the first delay time from the clock cycle, and the second time margin is essentially a time value obtained by subtracting the second delay time from the clock cycle. In the present implementation mode, the first time margin and second time margin of the first delay time and second delay time during communication between the server mainboard and the PCIe expansion board relative to the clock cycle respectively are calculated according to the hardware parameters, whereby the accuracy of the first time margin and the second time margin is further ensured.

Based on the above-mentioned embodiments, before the calculating the first time margin of the first delay time relative to the clock cycle and the second time margin of the second delay time relative to the clock cycle, the method further includes:

obtaining communication protocol parameters between the server mainboard and the PCIe expansion board;

obtaining a corresponding clock cycle according to the communication protocol parameters.

It is to be noted that clock cycles of clock signals required by communication between the server mainboard and the PCIe expansion board based on different types of protocols may be different, so the key point of the present implementation mode is that, before the first time margin of the first delay time relative to the clock cycle and the second time margin of the second delay time relative to the clock cycle are calculated, a related parameter of a communication protocol, i.e., a communication protocol parameter, for communication between the server mainboard and the PCIe expansion board is obtained in advance, and then the corresponding clock cycle is obtained according to the communication protocol parameter to further calculate the first time margin and the second time margin subsequently. In the present implementation mode, the accuracy of the first time margin and the second time margin may further be ensured, and the overall clock control reliability is further ensured.

Based on the above-mentioned embodiments, as a preferred implementation mode, the generating a corresponding clock phase difference based on the time margin average of the first time margin and the second time margin includes:

calculating a corresponding phase angle based on a proportion of the time margin average of the first time margin and the second time margin in a clock cycle;

It is to be noted that, when the corresponding clock phase difference is generated in this step based on the time margin average of the first time margin and the second time margin, a proportion of the time margin average of the first time margin and the second time margin in a clock cycle is calculated first, then a corresponding phase angle is calculated according to the proportion, and the phase angle is further set as the clock phase difference. A formula for calculating the phase angle may be represented as:

$$t = \frac{1}{f} * \frac{\theta}{360},$$

where t represents the time margin average, $$\frac{1}{f}$$

represents the clock cycle, and f represents a clock frequency. For example, the clock frequency is 50 MHz, the phase angle is 30°, and the time margin average is about 1.667 ns.

In the present implementation mode, the accuracy of the clock phase difference may further be ensured, and the overall clock control reliability is further ensured.

Based on the above-mentioned embodiments, as a preferred implementation mode, the hardware parameter includes a communication line parameter and a chip operation parameter.

It is to be noted that the key point of the present implementation mode is that the hardware parameter is further detailed to a communication line parameter and a chip operation parameter. The communication line parameter includes, but not limited to, a cable length parameter of a communication line, a medium parameter of a cable, etc. The chip operation parameter includes, but not limited to, an operation delay parameter of a chip, an initialization time parameter for data communication of the chip, etc. The hardware parameter includes the communication line parameter and the chip operation parameter, whereby the first time margin and the second time margin may be calculated relatively accurately according to the communication line and chip that data passes through during communication between the server mainboard and the PCIe expansion board, to further ensure the overall clock control reliability.

Figure 4:
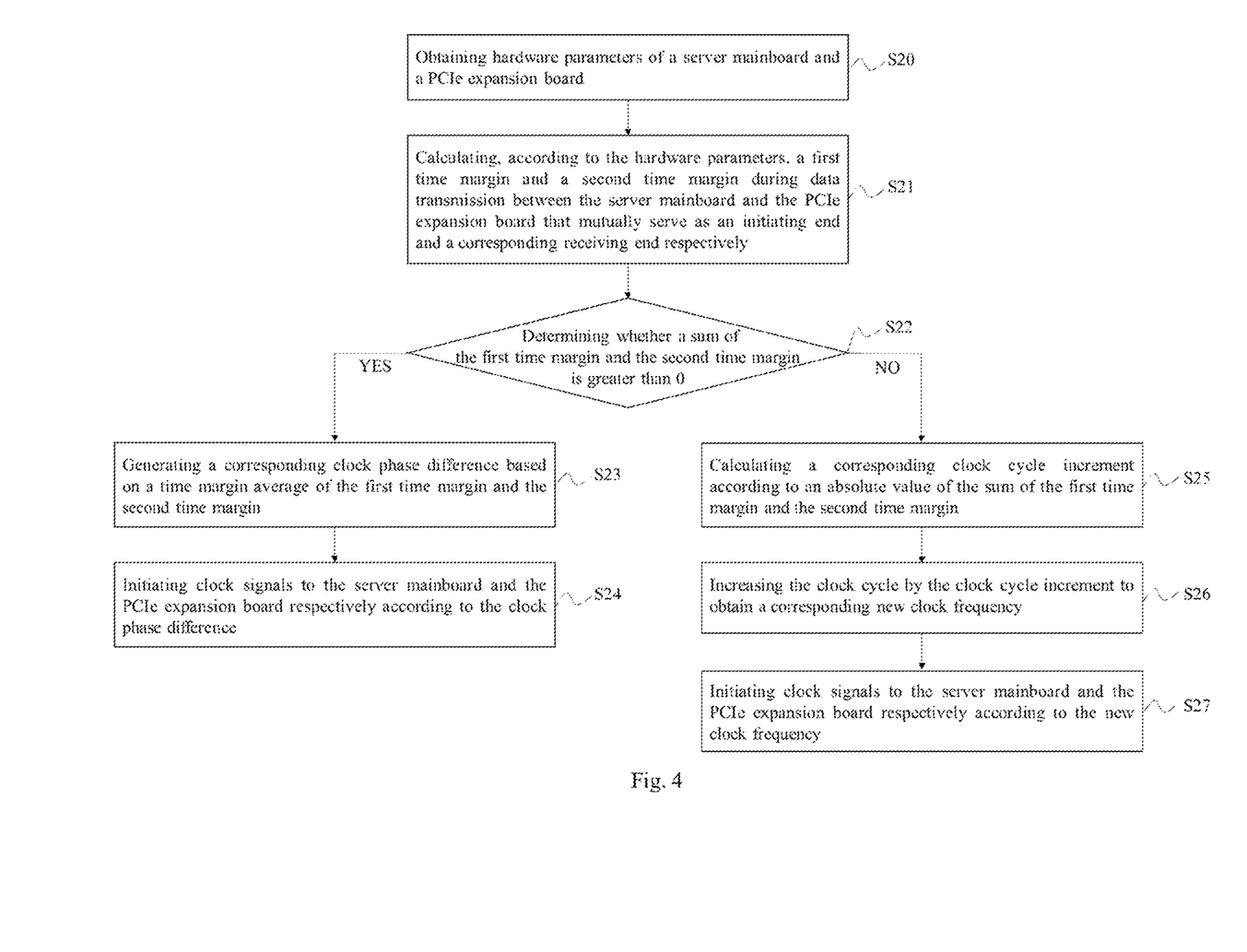
FIG. 4 is a flowchart of a clock control method according to an embodiment of the present application.

Referring to FIG. 4, the embodiments of the present application disclose a clock control method, including the following steps.

Step S20: obtaining hardware parameters of a server mainboard and a PCIe expansion board, where the PCIe expansion board is connected to the server mainboard.

Step S21: calculating, according to the hardware parameters, a first time margin and a second time margin during data transmission between the server mainboard and the PCIe expansion board that mutually serve as an initiating end and a corresponding receiving end respectively.

Step S22: determining whether a sum of the first time margin and the second time margin is greater than 0; if YES, performing steps S23 and S24; if NOT, performing steps S25-S27.

Step S23: generating a corresponding clock phase difference based on the time margin average of the first time margin and the second time margin.

Step S24: initiating clock signals to the server mainboard and the PCIe expansion board respectively according to the clock phase difference.

Step S25: calculating a corresponding clock cycle increment according to an absolute value of the sum of the first time margin and the second time margin.

Step S26: increasing the clock cycle by the clock cycle increment to obtain a corresponding new clock frequency.

Step S27: initiating clock signals to the server mainboard and the PCIe expansion board respectively according to the new clock frequency.

It is to be noted that, when it is determined that the sum of the first time margin and the second time margin is not greater than 0, namely less than 0, it indicates that there is no equilibrium time margin found between the first time margin and the second time margin to ensure the overall reliability of bidirectional communication between the server mainboard and the PCIe expansion board. Therefore, in the present embodiment, when it is determined that the sum of the first time margin and the second time margin is less than 0, a corresponding clock cycle increment is further calculated according to an absolute value of the sum of the first time margin and the second time margin, the clock cycle is increased by the clock cycle increment to obtain a corresponding new clock frequency, and clock signals are further initiated to the server mainboard and the PCIe expansion board according to the new clock frequency. As such, the overall reliability of bidirectional communication between the server mainboard and the PCIe expansion board is ensured by the new clock frequency. In the present implementation mode, the frequency of the clock signal is reduced when the sum of the first time margin and the second time margin is less than 0, whereby the overall clock control reliability is further ensured.

Based on the above-mentioned embodiment, as a preferred implementation mode, before the calculating a corresponding clock cycle increment according to the absolute value of the sum of the first time margin and the second time margin, the method further includes:

outputting a parameter modification option of the hardware parameters to a user;

determining whether the user selects the parameter modification option;

if the parameter modification option is selected, generating optimization suggestion information of the hardware parameters according to the sum of the first time margin and the second time margin;

otherwise the step of calculating a corresponding clock cycle increment according to the absolute value of the sum of the first time margin and the second time margin is performed.

It is to be noted that the key point of the present implementation mode is that, when it is determined that the sum of the first time margin and the second time margin is less than 0, a parameter modification option of the hardware parameter is further output to a user, whether the user selects the parameter modification option is determined, namely whether the user receives a modified hardware parameter is determined, and if the user selects the parameter modification option, optimization suggestion information of the hardware parameter is generated according to the sum of the first time margin and the second time margin such that the user modifies hardware attributes of the server mainboard and the PCIe expansion board to ensure the overall reliability of bidirectional communication. In the present embodiment, the parameter modification option is provided for the user when the sum of the first time margin and the second time margin is less than 0, whereby the first time margin and the second time margin may be adjusted in more manners, and the overall reliability of bidirectional communication between the server mainboard and the PCIe expansion board is further ensured.

Figure 5:
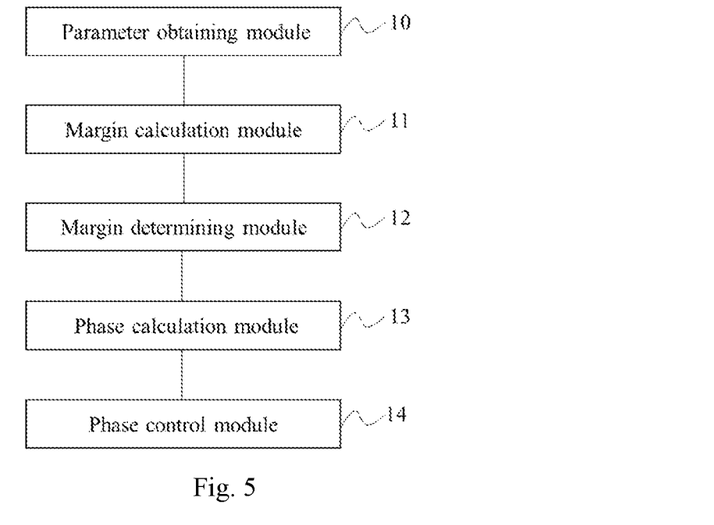
FIG. 5 is a schematic structural diagram of a clock control apparatus according to an embodiment of the present application.

Referring to FIG. 5, the embodiments of the present application provide a clock control apparatus, including:

a parameter obtaining module 10, configured to obtain hardware parameters of a server mainboard and a Peripheral Component Interconnect express (PCIe) expansion board, wherein the PCIe expansion board is connected to the server mainboard;

a margin calculation module 11, configured to calculate, according to the hardware parameters, a first time margin and a second time margin during data transmission between the server mainboard and the PCIe expansion board that mutually serve as an initiating end and a corresponding receiving end respectively;

a margin determining module 12, configured to determine whether a sum of the first time margin and the second time margin is greater than 0, and if YES, call a phase calculation module 13;

a phase calculation module 13, configured to generate a corresponding clock phase difference based on a time margin average of the first time margin and the second time margin; and a phase control module 14, configured to initiate clock signals to the server mainboard and the PCIe expansion board respectively according to the clock phase difference.

According to the clock control apparatus provided in the present application, hardware parameters of a server mainboard and a PCIe expansion board connected to the server mainboard are obtained first; further, a first time margin and a second time margin during data transmission between the server mainboard and the PCIe expansion board that mutually serve as an initiating end and a corresponding receiving end respectively are calculated according to the hardware parameters; furthermore, whether a sum of the first time margin and the second time margin is greater than 0 is determined; if YES, a corresponding clock phase difference is generated based on a time margin average of the first time margin and the second time margin; and clock signals are further initiated to the server mainboard and the PCIe expansion board respectively according to the clock phase difference. According to the apparatus, according to the first time margin and second time margin of unidirectional communication between the server mainboard and the PCIe expansion board, when the sum of the first time margin and the second time margin is greater than 0, the corresponding clock phase difference is generated according to the time margin average of the first time margin and the second time margin, and the clock signals are initiated to the server mainboard and the PCIe expansion board respectively according to the clock phase difference. In this manner, timing optimization of bidirectional data communication between the server mainboard and the PCIe expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board.

In addition, the embodiments of the present application also provide a clock control device, including:

a memory, configured to store a computer program;

a processor, configured to execute the computer program to implement any steps of the clock control method as described above.

According to the clock control device provided in the present application, hardware parameters of a server mainboard and a PCIe expansion board connected to the server mainboard are obtained first; further, a first time margin and a second time margin during data transmission between the server mainboard and the PCIe expansion board that mutually serve as an initiating end and a corresponding receiving end respectively are calculated according to the hardware parameters; furthermore, whether a sum of the first time margin and the second time margin is greater than 0 is determined; if YES, a corresponding clock phase difference is generated based on a time margin average of the first time margin and the second time margin; and clock signals are further initiated to the server mainboard and the PCIe expansion board respectively according to the clock phase difference. According to the device, according to the first time margin and second time margin of unidirectional communication between the server mainboard and the PCIe expansion board, when the sum of the first time margin and the second time margin is greater than 0, the corresponding clock phase difference is generated according to the time margin average of the first time margin and the second time margin, and the clock signals are initiated to the server mainboard and the PCIe expansion board respectively according to the clock phase difference. In this manner, timing optimization of bidirectional data communication between the server mainboard and the PCIe expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board.

The present application further provides a computer-readable storage medium, having a computer program stored thereon which, when executed by a processor, implements any steps of the IO processing method as described above.

According to the computer-readable storage medium provided in the present application, hardware parameters of a server mainboard and a PCIe expansion board connected to the server mainboard are obtained first; further, a first time margin and a second time margin during data transmission between the server mainboard and the PCIe expansion board that mutually serve as an initiating end and a corresponding receiving end respectively are calculated according to the hardware parameters; furthermore, whether a sum of the first time margin and the second time margin is greater than 0 is determined; if YES, a corresponding clock phase difference is generated based on a time margin average of the first time margin and the second time margin; and clock signals are further initiated to the server mainboard and the PCIe expansion board respectively according to the clock phase difference. According to the computer-readable storage medium, according to the first time margin and second time margin of unidirectional communication between the server mainboard and the PCIe expansion board, when the sum of the first time margin and the second time margin is greater than 0, the corresponding clock phase difference is generated according to the time margin average of the first time margin and the second time margin, and the clock signals are initiated to the server mainboard and the PCIe expansion board respectively according to the clock phase difference. In this manner, timing optimization of bidirectional data communication between the server mainboard and the PCIe expansion board is relatively implemented, and the occurrence of a situation where in any data communication direction between the server mainboard and the PCIe expansion board, data transmitted by the initiating end at a given high-level moment does not reach the receiving end at a next high-level moment may be prevented, thus ensuring the reliability of communication between the server mainboard and the PCIe expansion board.

The clock control method, apparatus, and device and storage medium provided in the present application are introduced above in detail. All the embodiments in this specification are described in a progressive manner. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part can be referred to the description of the method part. It should be noted that for a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. Without further limitation, the elements defined by the statement "comprising a" do not preclude the existence of additional identical elements in the process, method, article, or apparatus that include said elements.

What is claimed is:

1. A clock control method, comprising:

obtaining hardware parameters of a server mainboard and a Peripheral Component Interconnect express (PCIe) expansion board, wherein the PCIe expansion board is connected to the server mainboard;

calculating, according to the hardware parameters, a first delay time and a second delay time during data transmission between the server mainboard and the PCIe expansion board that mutually serve as an initiating end and a corresponding receiving end respectively;

calculating a first time margin of the first delay time relative to a clock cycle and a second time margin of the second delay time relative to the clock cycle, wherein the first time margin is a time value obtained by subtracting the first delay time from the clock cycle, and the second time margin is a time value obtained by subtracting the second delay time from the clock cycle;

determining whether a sum of the first time margin and the second time margin is greater than 0;

when the sum of the first time margin and the second time margin is greater than 0, generating a corresponding clock phase difference based on a time margin average of the first time margin and the second time margin; and initiating clock signals to the server mainboard and the PCIe expansion board respectively according to the clock phase difference.

2. The clock control method according to claim 1, wherein before the calculating the first time margin of the first delay time relative to the clock cycle and the second time margin of the second delay time relative to the clock cycle, the method further comprises:

obtaining communication protocol parameters between the server mainboard and the PCIe expansion board; and obtaining a corresponding clock cycle according to the communication protocol parameters.

3. The clock control method according to claim 1, wherein the generating the corresponding clock phase difference based on the time margin average of the first time margin and the second time margin comprises:

calculating a corresponding phase angle based on a proportion of the time margin average of the first time margin and the second time margin in the clock cycle; and setting the phase angle as the clock phase difference.

4. The clock control method according to claim 3, wherein the phase angle is calculated according to the following formula:

$$t = \frac{1}{f} * \frac{\theta}{360}$$

where t represents the time margin average, $$\frac{1}{f}$$

represents the clock cycle, and f represents a clock frequency.

5. The clock control method according to claim 1, wherein the hardware parameters comprise communication line parameters and chip operation parameters.

6. The clock control method according claim 1, further comprising:

in response to determining that the sum of the first time margin and the second time margin is less than 0:

calculating a corresponding clock cycle increment according to an absolute value of the sum of the first time margin and the second time margin;

increasing the clock cycle by the clock cycle increment to obtain a corresponding new clock frequency; and initiating clock signals to the server mainboard and the PCIe expansion board respectively according to the new clock frequency.

7. The clock control method according to claim 6, wherein before the calculating the corresponding clock cycle increment according to the absolute value of the sum of the first time margin and the second time margin, the method further comprises:

outputting a parameter modification option of the hardware parameters to a user;

in response to the user selecting the parameter modification option, generating optimization suggestion information of the hardware parameters according to the sum of the first time margin and the second time margin; and in response to the user not selecting the parameter modification option, performing the step of calculating the corresponding clock cycle increment according to the absolute value of the sum of the first time margin and the second time margin.

8. A clock control device, comprising:

a memory, having a computer program stored thereon; and a processor, configured to implement, when executing the computer program, operations comprising:

obtaining hardware parameters of a server mainboard and a Peripheral Component Interconnect express (PCIe) expansion board, wherein the PCIe expansion board is connected to the server mainboard;

calculating, according to the hardware parameters, a first delay time and a second delay time during data transmission between the server mainboard and the PCIe expansion board that mutually serve as an initiating end and a corresponding receiving end respectively;

calculating a first time margin of the first delay time relative to a clock cycle and a second time margin of the second delay time relative to the clock cycle, wherein the first time margin is a time value obtained by subtracting the first delay time from the clock cycle, and the second time margin is a time value obtained by subtracting the second delay time from the clock cycle;

determining whether a sum of the first time margin and the second time margin is greater than 0;

when the sum of the first time margin and the second time margin is greater than 0, generating a corresponding clock phase difference based on a time margin average of the first time margin and the second time margin; and initiating clock signals to the server mainboard and the PCIe expansion board respectively according to the clock phase difference.

9. A clock control device according to claim 8, wherein before the calculating the first time margin of the first delay time relative to the clock cycle and the second time margin of the second delay time relative to the clock cycle, the operations further comprise:

obtaining communication protocol parameters between the server mainboard and the PCIe expansion board; and obtaining a corresponding clock cycle according to the communication protocol parameters.

10. A clock control device according to claim 8, wherein the generating the corresponding clock phase difference based on the time margin average of the first time margin and the second time margin comprises:

calculating a corresponding phase angle based on a proportion of the time margin average of the first time margin and the second time margin in the clock cycle; and setting the phase angle as the clock phase difference.

11. A clock control device according to claim 10, wherein the phase angle is calculated according to the following formula:

$$t = \frac{1}{f} * \frac{\theta}{360}$$

where t represents the time margin average $\frac{1}{f}$ represents the clock cycle, and f represents a clock frequency.

12. A clock control device according to claim 8, wherein the hardware parameters comprise communication line parameters and chip operation parameters.

13. A clock control device according to claim 8, wherein the operations further comprise:
  in response to determining that the sum of the first time margin and the second time margin is less than 0:
    calculating a corresponding clock cycle increment according to an absolute value of the sum of the first time margin and the second time margin;
    increasing the clock cycle by the clock cycle increment to obtain a corresponding new clock frequency; and
    initiating clock signals to the server mainboard and the PCIe expansion board respectively according to the new clock frequency.

14. A clock control device according to claim 13, wherein before the calculating the corresponding clock cycle increment according to the absolute value of the sum of the first time margin and the second time margin, the operations further comprise:
  outputting a parameter modification option of the hardware parameters to a user;
  in response to the user selecting the parameter modification option, generating optimization suggestion information of the hardware parameters according to the sum of the first time margin and the second time margin; and
  in response to the user not selecting the parameter modification option, performing the step of calculating the corresponding clock cycle increment according to the absolute value of the sum of the first time margin and the second time margin.

15. A non-transitory computer-readable storage medium, having a computer program stored thereon which, when executed by a processor, implements operations comprising:
  obtaining hardware parameters of a server mainboard and a Peripheral Component Interconnect express (PCIe) expansion board, wherein the PCIe expansion board is connected to the server mainboard;
  calculating, according to the hardware parameters, a first delay time and a second delay time during data transmission between the server mainboard and the PCIe expansion board that mutually serve as an initiating end and a corresponding receiving end respectively;
  calculating a first time margin of the first delay time relative to a clock cycle and a second time margin of the second delay time relative to the clock cycle, wherein the first time margin is a time value obtained by subtracting the first delay time from the clock cycle, and the second time margin is a time value obtained by subtracting the second delay time from the clock cycle;
  determining whether a sum of the first time margin and the second time margin is greater than 0;
  when the sum of the first time margin and the second time margin is greater than 0, generating a corresponding clock phase difference based on a time margin average of the first time margin and the second time margin; and
  initiating clock signals to the server mainboard and the PCIe expansion board respectively according to the clock phase difference.

16. The non-transitory computer-readable storage medium according to claim 15, wherein before the calculating the first time margin of the first delay time relative to the clock cycle and the second time margin of the second delay time relative to the clock cycle, the operations further comprise:
  obtaining communication protocol parameters between the server mainboard and the PCIe expansion board; and
  obtaining a corresponding clock cycle according to the communication protocol parameters.

17. The non-transitory computer-readable storage medium according to claim 15, wherein the generating the corresponding clock phase difference based on the time margin average of the first time margin and the second time margin comprises:
  calculating a corresponding phase angle based on a proportion of the time margin average of the first time margin and the second time margin in the clock cycle; and
  setting the phase angle as the clock phase difference.

18. The non-transitory computer-readable storage medium according to claim 15, wherein the hardware parameters comprise communication line parameters and chip operation parameters.

19. The non-transitory computer-readable storage medium according to claim 15, wherein the operations further comprise:
  in response to determining that the sum of the first time margin and the second time margin is less than 0:
    calculating a corresponding clock cycle increment according to an absolute value of the sum of the first time margin and the second time margin;
    increasing the clock cycle by the clock cycle increment to obtain a corresponding new clock frequency; and
    initiating clock signals to the server mainboard and the PCIe expansion board respectively according to the new clock frequency.

20. The non-transitory computer-readable storage medium according to claim 19, wherein before the calculating the corresponding clock cycle increment according to the absolute value of the sum of the first time margin and the second time margin, the operations further comprise:
  outputting a parameter modification option of the hardware parameters to a user;
  in response to the user selecting the parameter modification option, generating optimization suggestion information of the hardware parameters according to the sum of the first time margin and the second time margin; and
  in response to the user not selecting the parameter modification option, performing the step of calculating the corresponding clock cycle increment according to the absolute value of the sum of the first time margin and the second time margin.

* * * * *